US011750876B2

(12) United States Patent
Lan

(10) Patent No.: US 11,750,876 B2
(45) Date of Patent: Sep. 5, 2023

(54) METHOD AND APPARATUS FOR DETERMINING OBJECT ADDING MODE, ELECTRONIC DEVICE AND MEDIUM

(71) Applicant: Beijing Bytedance Network Technology Co., Ltd., Beijing (CN)

(72) Inventor: Feng Lan, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/886,332

(22) Filed: Aug. 11, 2022

(65) Prior Publication Data
US 2022/0394326 A1 Dec. 8, 2022

Related U.S. Application Data

(63) Continuation of application No. PCT/CN2021/113335, filed on Aug. 18, 2021.

(30) Foreign Application Priority Data

Aug. 26, 2020 (CN) .......................... 202010870279.4

(51) Int. Cl.
*H04N 21/431* (2011.01)
*G06V 20/40* (2022.01)
*H04N 21/81* (2011.01)

(52) U.S. Cl.
CPC ......... *H04N 21/4316* (2013.01); *G06V 20/46* (2022.01); *G06V 20/48* (2022.01); *H04N 21/8146* (2013.01)

(58) Field of Classification Search
CPC ........... H04N 21/4316; H04N 21/8146; G06V 20/46; G06V 20/48
See application file for complete search history.

(56) References Cited

U.S. PATENT DOCUMENTS

2002/0075407 A1* 6/2002 Cohen-Solal .... H04N 21/44008
348/565
2002/0196370 A1* 12/2002 Dagtas ................. H04N 19/467
348/600
(Continued)

FOREIGN PATENT DOCUMENTS

CN 101641873 A 2/2010
CN 104219559 A 12/2014
(Continued)

OTHER PUBLICATIONS

International Search Report issued in corresponding International Application No. PCT/CN2021/113335 dated Nov. 19, 2021.
(Continued)

*Primary Examiner* — Michael R Telan
(74) *Attorney, Agent, or Firm* — ARENTFOX SCHIFF LLP

(57) ABSTRACT

Embodiments of the present application disclose a method and apparatus for determining an object adding mode, an electronic device and a medium. A specific implementation of the method includes: obtaining a target video and a to-be-added object set to be added to a target video; determining time periods corresponding to storyboards of the target video; determining a presentation period of a to-be-added object in the to-be-added object set in the target video based on the time periods corresponding to the storyboards; generating object adding indication information based on the determined presentation period, where the object adding indication information includes time prompt information used to indicate the presentation period of the to-be-added object in the to-be-added object set in the target video. According to this implementation, automatic selection of time for adding the to-be-added object to the target video is realized.

18 Claims, 4 Drawing Sheets

(56) References Cited

U.S. PATENT DOCUMENTS

| | | | |
|---|---|---|---|
| 2008/0046925 A1 | 2/2008 | Lee et al. | |
| 2008/0178249 A1 | 7/2008 | Gordon et al. | |
| 2014/0359656 A1* | 12/2014 | Banica | H04N 21/234 |
| | | | 725/32 |
| 2016/0366464 A1* | 12/2016 | Rouady | H04N 21/4312 |
| 2018/0084291 A1 | 3/2018 | Wei et al. | |
| 2018/0310071 A1* | 10/2018 | Panchaksharaiah | G06F 16/74 |

FOREIGN PATENT DOCUMENTS

| | | | |
|---|---|---|---|
| CN | 104811744 A | 7/2015 |
| CN | 106131638 A | 11/2016 |
| CN | 110415005 A | 11/2019 |
| CN | 111292280 A | 6/2020 |
| CN | 112004116 A | 11/2020 |

OTHER PUBLICATIONS

First Chinese Office Action issued in corresponding Chinese Application No. 202010870279.4.

Chinese Notice of Allowance issued in corresponding Chinese Application No. 202010870279.4.

Lu, et al., Online Video Advertising Based on Fine-Grained Video Tags; Journal of Computer Research and Development; Dec. 2014; pp. 2733-2745.

Liang, et al., Automatic Generation of Textual Advertisement for Video Advertising, 2018 IEEE Fourth International Conference of Multimedia Big Data (BigMM), Sep. 13, 2018, 5 pages; URL:https://ieeexplore.IEEE.org/document/8499465.

* cited by examiner

METHOD AND APPARATUS FOR DETERMINING OBJECT ADDING MODE, ELECTRONIC DEVICE AND MEDIUM

CROSS-REFERENCE TO RELATED APPLICATIONS

This application is a continuation application of International Application No. PCT/CN2021/113335, filed on Aug. 18, 2021, which claims priority to Chinese patent application No. 202010870279.4, filed on Aug. 26, 2020. Both of the aforementioned applications are hereby incorporated by reference in their entireties.

TECHNICAL FIELD

Embodiments of the present application relate to the field of computer technologies, and in particular, to a method and apparatus for determining an object adding mode, an electronic device, and a medium.

BACKGROUND

With a rapid development of Internet technologies, it is often necessary to enrich content of a video by adding corresponding business objects at appropriate positions in the video.

In related modes, a time node for adding objects in the video is usually determined by means of manual operations or random assignment.

SUMMARY

Embodiments of the present application provide a method and apparatus for determining an object adding mode, an electronic device and a medium.

In a first aspect, an embodiment of the present application provides a method for determining an object adding mode, the method includes: obtaining a target video and a to-be-added object set to be added to a target video; determining time periods corresponding to storyboards in the target video; determining a presentation period of a to-be-added object in the to-be-added object set in the target video based on the time periods corresponding to the storyboards; generating object adding indication information based on the determined presentation period, where the object adding indication information includes time prompt information used to indicate the presentation period of the to-be-added object in the to-be-added object set in the target video.

In a second aspect, an embodiment of the present application provides an apparatus for determining an object adding mode, the apparatus includes: an obtaining unit, configured to obtain a target video and a to-be-added object set to be added to a target video; a first determining unit, configured to determine time periods corresponding to storyboards in the target video; a second determining unit, configured to determine a presentation period of a to-be-added object in the to-be-added object set in the target video based on the time periods corresponding to the storyboards; a generating unit, configured to generate object adding indication information based on the determined presentation period, where the object adding indication information includes time prompt information used to indicate the presentation period of the to-be-added object in the to-be-added object set in the target video.

In a third aspect, an embodiment of the present application provides an electronic device, the electronic device includes: one or more processors; a storage apparatus on which one or more programs are stored; when the one or more programs are executed by the one or more processors, the one or more processors are enabled to implement the method according to any one of implementations in the first aspect.

In a fourth aspect, an embodiment of the present application provides a computer-readable storage medium on which a computer program is stored, when the program is executed by a processor, the method according to any one of implementations in the first aspect is implemented.

In a fifth aspect, an embodiment of the present application further provides a computer program product, the computer program product includes a computer program, where the computer program is stored in a readable storage medium, one or more processors of an electronic device read the computer program from the readable storage medium and execute the computer program, so that the electronic device is enabled to implement the method according to any one of implementations in the first aspect.

In a sixth aspect, an embodiment of the present application further provides a computer program, where the computer program is stored in a readable storage medium, one or more processors of a device read the computer program from the readable storage medium, and execute the computer program, so that the device is enabled to implement the method according to any one of implementations in the first aspect.

According to the method and apparatus for determining an object adding mode, electronic device and medium provided by the embodiments of the present application, firstly time periods corresponding to storyboards of a target video are determined, and then a presentation period of a to-be-added object in the target video is determined based on the determined time periods, and then object adding indication information is generated, the object adding indication information includes time prompt information used to indicate the presentation period of the to-be-added object in the target video. In this way, automatic selection of time for adding the to-be-added object to the target video is realized, enabling the presentation period of the to-be-added object in the target video does not cross the storyboards as much as possible, thereby improving a fusion degree and a cohesion degree between the to-be-added object and the target video, and increasing acceptance of a user. Especially in the field of video advertising, a conversion rate of sticker advertisings can be significantly improved.

BRIEF DESCRIPTION OF DRAWINGS

Other features, objects and advantages of the present application will become more apparent by reading a detailed description of non-limiting embodiments made with reference to the following accompanying drawings.

DESCRIPTION OF EMBODIMENTS

The present application will be further described in detail below with reference to accompanying drawings and embodiments. It should be understood that the specific embodiments described herein are only used to explain the related invention, but not to limit the present disclosure. In addition, it should be noted that, for a convenience of description, only parts related to the present disclosure are shown in the accompanying drawings.

It should be noted that, the embodiments in the present application and features of the embodiments may be combined with each other in the case of no conflict. The present application will be described in detail below with reference to the accompanying drawings and in conjunction with the embodiments.

Figure 1:
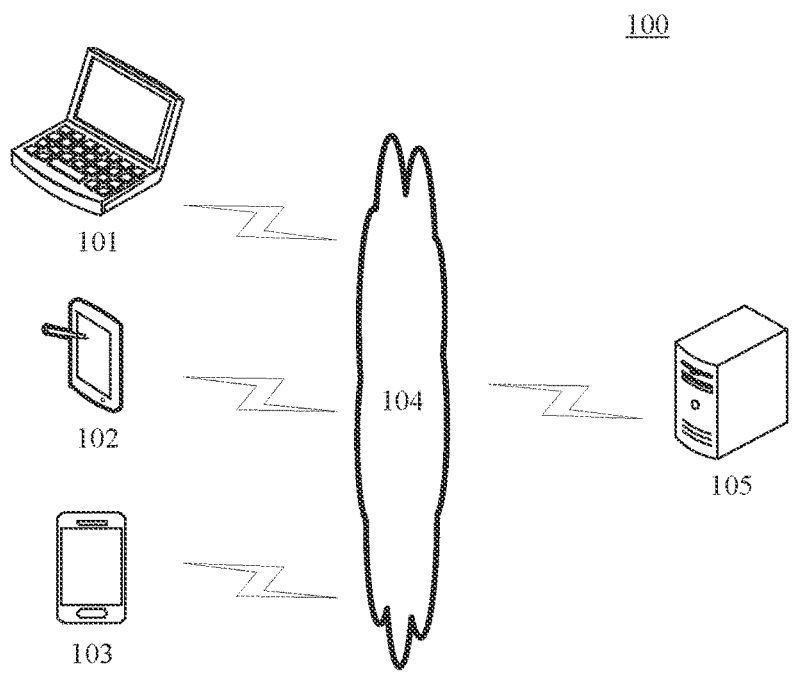
FIG. 1 is an exemplary system architecture diagram to which an embodiment of the present application may be applied.

FIG. 1 shows an exemplary architecture 100 to which a method for determining an adding object mode or an apparatus for determining an adding object mode of the present application may be applied.

As shown in FIG. 1, the system architecture 100 may include terminal devices 101, 102 and 103, a network 104 and a server 105. The network 104 is configured to provide a medium of communication links among the terminal devices 101, 102 and 103 and the server 105. The network 104 may include various connection types, such as wired, wireless communication links, or fiber optic cables and the like.

The terminal devices 101, 102, and 103 interact with the server 105 through the network 104 to receive or send messages and the like. Various communication client applications may be installed on the terminal devices 101, 102 and 103, such as web browser applications, shopping applications, search applications, instant messaging tools, email clients, social platform software, video editing applications and the like.

The terminal devices 101, 102, and 103 may be hardware or software. When the terminal devices 101, 102, 103 are hardware, they can be various electronic devices having display screens and supporting video edition, including but not limited to smart phones, tablet computers, laptop computers, desktop computers and the like. When the terminal devices 101, 102, and 103 are software, they can be installed in the electronic devices listed above. They may be implemented as multiple software or software modules (for example, the software or software modules for providing distributed services), or may be implemented as a single software or software module, which is not specifically limited herein.

The server 105 may be a server that provides various services, such as a background server that provides support for the video editing software displayed on the terminal devices 101, 102, and 103. The backend server can perform processing such as analysis on a received target video and a to-be-added object set to be added to the target video, and feed back generated a processing result (such as object adding indication information) to the terminal devices.

It should be noted that, the target video and the to-be-added object set to be added to the target video may also be directly stored locally on the server 105, and the server 105 may directly extract the locally stored target video and the to-be-added object set to be added to the target video for processing, at this time, the terminal devices 101, 102, 103 and the network 104 may not exist.

It should be noted that, the server may be hardware or software. When the server is hardware, it can be implemented as a distributed server cluster composed of multiple servers, or can be implemented as a single server. When the server is software, it can be implemented as multiple software or software modules (for example, the software or software modules for providing distributed services), or can be implemented as a single software or software module. The specific limitation is not limited herein.

It should be noted that, the method for determining the object adding mode provided by the embodiments of the present application is generally executed by the server 105; and correspondingly, the apparatus for determining the object adding mode is generally set in the server 105. In an embodiment, under a condition that a computing capability is satisfied, the method for determining the object adding method provided by the embodiments of the present application may also be executed by the terminal devices 101, 102, and 103; correspondingly, the apparatus for determining the object adding mode can also be set in the terminal devices 101, 102 and 103.

It should be understood that, the numbers of the terminal devices, networks and servers in FIG. 1 are merely illustrative. There can be any number of terminal devices, networks and servers according to implementation needs.

Figure 2:
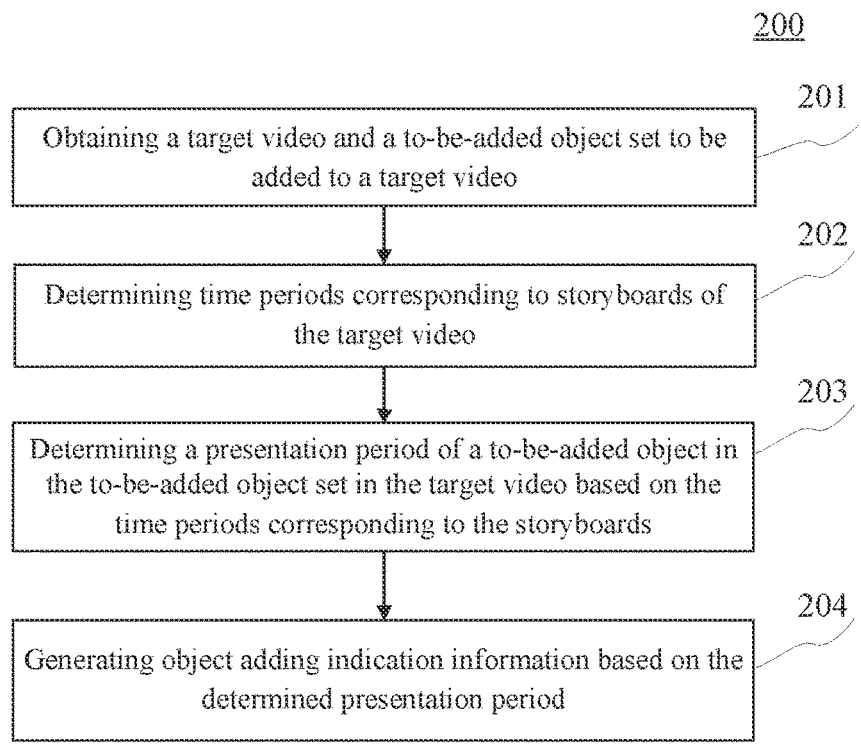
FIG. 2 is a flowchart of one embodiment of a method for determining an object adding mode according to the present application.

Continuing to refer to FIG. 2, a flow 200 of one embodiment of a method for determining an object adding mode according to the present application is shown. The method for determining the object adding mode includes the following steps:

step 201: obtaining a target video and a to-be-added object set to be added to a target video.

In this embodiment, an executive body of the method for determining the object adding mode (such as the server 105 shown in FIG. 1) may obtain the target video and the to-be-added object set to be added to the target video through a wired connection or a wireless connection. In which, the target video may refer to a video to which the to-be-added object is added. The target video may include, for example, a movie, a TV series, a short video, an electronic album and the like. The to-be-added object may include various objects that can be added to the target video. It may include, but is not limited to, at least one of the following: images, text boxes, stickers.

As an example, the executive body may obtain the to-be-added object set to be added to the target video and the target video pre-stored locally. As another example, the executive body may also obtain the target video and the to-be-added object set to be added to the target video from an electronic device (such as the terminal device shown in FIG. 1) that is communicatively connected thereto. As yet another example, the executive body may also obtain the target video locally, and obtain the to-be-added object set to be added to the target video from the electronic device (such as the terminal device shown in FIG. 1) that is communicatively connection thereto.

Step 202: determining time periods corresponding to storyboards of the target video.

In this embodiment, the executive body may determine the time periods corresponding to the storyboards of the target video obtained in step 201 in various modes. As an example, the executive body may adopt various shot boundary detection technologies to determine the time periods corresponding to the storyboards of the target video. The shot boundary detection technology may include, but is not limited to, at least one of the following: a pixel comparison method, a color histogram comparison method, a block matching comparison method and a double-threshold detection method. The time period corresponding to the storyboard may be used to indicate starting and ending times corresponding to a shot included in the target video. As an example, the 1st shot is from 0th minute 0th second to 0th minute 11th second, the 2nd shot is from 0th minute 12th second to 0th minute 26th second, and the 3rd shot is from 0th minute 27th seconds to 1 minute 3rd seconds.

Step 203, determining a presentation period of a to-be-added object in the to-be-added object set in the target video based on the time periods corresponding to the storyboards.

In this embodiment, based on the time periods corresponding to the storyboards determined in step 202, the executive body may determine the presentation period of the to-be-added object in the to-be-added object set in the target video in various modes. As an example, the executive body may firstly obtain the number of to-be-added objects that can be allocated to each of the storyboards. For example, when a duration indicated by the time period corresponding to the storyboard is 0-10 seconds, one to-be-added object can be allocated; and when the duration indicated by the time period corresponding to the storyboard is 11-30 seconds, two to-be-added objects can be allocated, and so on. Afterwards, the executive body may determine to which storyboards in the target video the to-be-added object(s) in the to-be-added object set will be added. For example, the executive body may randomly assign the to-be-added objects in the to-be-added object set to each of the storyboards in the target video, or may assign them in a preset order. For example, the executive body may assign the to-be-added object 1 to the 1st storyboard, assign the to-be-added objects 3 and 5 to the 2nd storyboard, and assign the to-be-added objects 2, 4 and 6 to the 3rd storyboard. Afterwards, the executive body may determine the presentation period of the to-be-added object allocated to the storyboards in the target video in various modes. For example, the executive body may randomly select a time period that satisfies a presentation period condition (such as not less than 2 seconds) within the time period corresponding to the 1st storyboard as the presentation period of the to-be-added object 1 (such as the 8th to 10th seconds). For another example, the executive body may determine an intermediate period (such as the 5th to 7th seconds) of the time period corresponding to the 1st storyboard as the presentation period of the to-be-added object 1.

In some optional implementations of this embodiment, the executive body may determine the presentation period of the to-be-added object in the to-be-added object set in the target video according to the following steps:

in a first step, determining a total duration of the target video.

In these implementation, the executive body may determine the total duration of the target video in various modes.

In a second step, determining an initial presentation period of the to-be-added object in the to-be-added object set in the target video based on the total duration of the target video.

In these implementations, the executive body may determine, based on the total duration of the target video determined in the first step, the initial presentation period of the to-be-added object in the to-be-added object set in the target video in various modes. As an example, the executive body may firstly determine the initial presentation period of the to-be-added object in the to-be-added object set in the target video, so as to make the to-be-added object distributed as evenly as possible in the total duration of the target video. For example, the total duration of the target video including 3 storyboards is 1 minute and 3 seconds, and the executive body may determine the initial presentation periods of the to-be-added objects in the to-be-added object set to be from the 0th minute 8th second to 0th minutes 9 seconds, 0th minutes 17th seconds to 0th minutes 18th seconds, 0th minutes 26th seconds to 0 minutes 27th seconds, 0th minutes 35th seconds to 0th minutes 36th seconds, 0th minutes 44th seconds to 0th minutes 45th seconds, 0th minutes 53th seconds to 0th minutes 54th seconds.

In a third step, selecting a to-be-added object crossing storyboards from the to-be-added object set to generate a target object set, based on a matching between the determined initial presentation period and the time periods corresponding to the storyboards of the target video.

In these implementations, based on the matching between the determined initial presentation period and the time periods corresponding to the storyboards of the target video, the executive body may select the to-be-added object crossing storyboards from the to-be-added object set to generate the target object set. Here the crossing storyboard is used to represent that a starting or ending moment of the time period corresponding to the storyboard of the target video is included in the initial presentation period of the to-be-added object. As an example, based on the fact that the 2nd shoot is from 0th minute 12th second to 0th minute 26th second, and the 3rd shoot is from 0th minute 27th second to 1st minute 3rd second, the executive body may add the to-be-added object whose initial presentation period is 0th minute 26th second to 0th minute 27th second to the target object set.

In a fourth step, determining the presentation period of the to-be-added object in the to-be-added object set in the target video based on an adjustment on the initial presentation period of a target object in the target object set.

In these implementation, the executive body may select the initial presentation period of the target object from the target object set for adjustment. Then, based on the adjusted initial presentation period and the initial presentation period that does not need to be adjusted, the executive body may determine the presentation period of the to-be-added object in the to-be-added object set in the target video.

Based on the optional implementations, the executive body may first determine the initial presentation period of the to-be-added object, and then perform adjustment based on the initial presentation period, and finally determine the presentation period of the to-be-added object in the to-be-added object set in the target video. Therefore, compared with the manner in which a respective presentation period of a respective to-be-added object is determined directly, on the one hand, a calculation amount is reduced, and on the other hand, a method for generating the presentation period can be flexibly adjusted based on actual needs.

In an embodiment, the executive body may determine the presentation period of the to-be-added object in the to-be-added object set in the target video through the following steps:

S1, determining whether the target object in the target object set satisfies a preset period adjusting condition.

In these implementations, the executive body may determine whether the target object(s) in the target object set generated in the above third step satisfies the preset period adjusting condition in various modes.

In an embodiment, the executive body may determine whether the target object(s) in the target object set satisfies the preset period adjusting condition through the following steps:

S11, determining a shot switching moment corresponding to the target object in the target object set based on the determined initial presentation period and the time periods corresponding to the storyboards of the target video.

In these implementations, the executive body may determine, based on the determined initial presentation period and the time periods corresponding to the storyboards of the target video, the shot switching moment corresponding to the target object in the target object set in various modes. The shot switching moment corresponding to the target object is used to represent a starting or ending moment of the time period corresponding to the storyboard of the target video within a range of the initial presentation period of the target object. As an example, the executive body may determine that the shot switching moment corresponding to the target object whose initial presentation period is from 0th minute 26th second (the staring) to 0th minute 27th second (the ending) is the 0th minute 27th second (the starting), that is, the switching moment of the 2nd shot and the 3rd shot.

S12, determining an adjusting direction of an initial presentation period of a to-be-adjusted target object in a time dimension based on the determined shot switching moment.

In these implementations, the executive body may determine, based on the determined shot switching moment, the adjusting direction of the initial presentation period of the to-be-adjusted target object in the time dimension in various modes. The to-be-adjusted target object may be any target object in the target object set. The adjusting direction in the time dimension may include a forward adjustment or a backward adjustment. As an example, the forward adjustment may be to adjust the initial presentation period from 0th minute 26th second to 0th minute 27th second as 0th minute 20th second to 0th minute 21st second. As yet another example, the backward adjustment may be to adjust the initial presentation period from 0th minute 26th to 0th minute 27th second as 0th minute 30th second to 0th minute 31st second.

In these implementations, the executive body may determine the adjusting direction in the time dimension randomly or according to a preset rule. As an example, the preset rule may be adjusting to an intermediate moment (for example, ½ of the total duration) of the target video in the time dimension. As yet another example, the preset rule may be to adjusting in a direction of a storyboard in which the initial presentation period of the to-be-adjusted target object overlaps more with the time period corresponding to the crossed storyboard.

S13, determining whether the initial presentation period of the to-be-adjusted target object after adjustment in the adjusting direction overlaps with an initial presentation period of a to-be-added object of a storyboard in the adjusting direction.

In these implementations, the executive body may determine whether the initial presentation period of the to-be-adjusted target object after adjustment in the adjusting direction determined in step S12 overlaps with the initial presentation of the to-be-added object of the storyboard in the adjusting direction in various modes.

Based on the optional implementations, the executive body may determine whether the initial presentation period of the to-be-adjusted target object after adjustment in the adjusting direction overlaps with the initial presentation period of the to-be-added object of the storyboard in the adjusting direction, and use such determination as a basis for determining whether the period adjusting condition is satisfied. Among them, the storyboard in the adjusting direction may be one storyboard, or may be a continuous preset number of storyboards (for example, a case where the initial presentation period of the to-be-added object crosses N storyboards), which is not limited herein.

In an embodiment, the executive body may determine whether the initial presentation period of the to-be-adjusted target object after adjustment in the adjusting direction overlaps with the initial presentation period of the to-be-added object of the storyboard in the adjusting direction through the following steps:

S131, determining a presentation interval between a to-be-added object closest to the initial presentation period of the to-be-adjusted target object and the to-be-adjusted target object in the adjusting direction.

In these implementations, the executive body may firstly determine the presentation interval between the to-be-added object that is closest to the initial presentation period of the to-be-adjusted target object and the to-be-adjusted target object in the adjusting direction determined in the above step S12. Among them, the presentation interval may include a time difference between an ending moment of an initial presentation period of a to-be-added object earlier and a starting moment of an initial presentation period of an adjacent to-be-added object later in the time dimension.

S132, determining whether the initial presentation period of the to-be-adjusted target object after adjustment in the adjusting direction overlaps with the initial presentation period of the to-be-added object of the storyboard in the adjusting direction, based on a comparison between the presentation interval and a duration indicated by the initial presentation period of the to-be-adjusted target object.

In these implementations, as an example, in response to determining that the presentation interval determined in the above step S131 is greater than the duration indicated by the initial presentation period of the to-be-adjusted target object, the executive body may determine that the initial presentation period of the to-be-adjusted target object after adjustment in the adjusting direction does not overlap with the initial presentation period of the to-be-added object of the storyboard in the adjusting direction. As another example, in response to determining that the presentation interval determined in step S131 is not greater than the duration indicated by the initial presentation period of the to-be-adjusted target object, the executive body may determine that the initial presentation period of the to-be-adjusted target object after adjustment in the adjusting direction overlaps with the initial presentation period of the to-be-added object of the storyboard in the adjusting direction.

Based on the optional implementations, the executive body may use the comparison between the presentation interval of adjacent to-be-added objects and the presentation duration of the target object as the basis for determining whether the time period adjusting condition is satisfied.

In an embodiment, the executive body may determine whether the initial presentation period of the to-be-adjusted target object after adjustment in the adjusting direction overlaps with the initial presentation period of the to-be-added object of the storyboard in the adjusting direction through the following steps:

S13'1, determining a total duration of the initial presentation period of the to-be-added object corresponding to a target storyboard.

In these implementations, the executive body may firstly determine the target storyboard. The target storyboard is generally consistent with the adjusting direction, and overlaps with the initial presentation period of the to-be-adjusted target object. As an example, as described above, if the adjusting direction is forward adjustment in the time dimension, the executive body may determine that the 2nd storyboard is the target storyboard. If the adjusting direction is backward adjustment in the time dimension, the executive body may determine that the 3rd storyboard is the target sub-scope. Afterwards, the executive body may determine the total duration of the initial presentation period of the to-be-added object corresponding to the target storyboard in various modes. As an example, the executive body may determine a sum of an overlapping portion between the initial presentation period of the to-be-added object(s) except the target object and the duration corresponding to the target storyboard, and the duration indicated by the initial presentation period of the target object as the total duration.

S13'2, determining whether the initial presentation period of the to-be-adjusted target object after adjustment in the adjusting direction overlaps with the initial presentation period of the to-be-added object of the storyboard in the adjusting direction, based on the total duration and the duration of the time period corresponding to the target storyboard.

In these implementations, as an example, in response to determining that the total duration determined in the above step S13'1 is less than the duration of the time period corresponding to the target storyboard, the executive body may determine that the initial presentation period of the to-be-adjusted target object after adjustment in the adjusting direction does not overlap with the initial presentation period of the to-be-added object of the storyboard in the adjusting direction. As yet another example, in response to determining that the total duration determined in the above step S13'1 is not less than the duration of the time period corresponding to the target storyboard, the executive body may determine that the initial presentation period of the to-be-adjusted target object after adjustment in the adjusting direction overlaps with the initial presentation period of the to-be-added object of the storyboard in the adjusting direction.

Based on the optional implementations, the executive body can use the comparison between the total duration of the initial presentation period of the to-be-added object corresponding to the target storyboard and the duration of the time period corresponding to the target storyboard as the basis for determining whether the time period adjusting condition is satisfied.

S14, determining whether the target object in the target object set satisfies the preset period adjusting condition, based on whether the initial presentation period of the to-be-adjusted target object after adjustment in the adjusting direction overlaps with the initial presentation period of the to-be-added object of the storyboard in the adjusting direction.

In these implementations, the executive body may determine, based on whether the initial presentation period of the to-be-adjusted target object after adjustment in the adjusting direction overlaps with the initial presentation period of the to-be-added object of the storyboard in the adjusting direction, whether the target object(s) in the object set satisfies the preset period adjusting condition in various modes. As an example, in response to determining that the initial presentation period of the to-be-adjusted target object after adjustment in the adjusting direction overlaps with the initial presentation period of the to-be-added object of the storyboard in the adjusting direction, the executive body may determine that the preset period adjusting condition is not satisfied.

In an embodiment, in response to determining that the initial presentation period of the to-be-adjusted target object after adjustment in the adjusting direction does not overlap with the initial presentation period of the to-be-added object of the storyboard in the adjusting direction, the executive body may determine that the preset period adjusting condition is satisfied.

In an embodiment, the executive body can also determine whether the target object(s) in the target object set satisfies the preset period adjusting condition through the following steps:

S141, in response to determining that the initial presentation period of the to-be-adjusted target object after adjustment in the adjusting direction overlaps with the initial presentation period of the to-be-added object of the storyboard in the adjusting direction, determining whether an initial presentation period of the to-be-adjusted target object after adjustment in an opposite direction of the adjusting direction overlaps with an initial presentation period of a to-be-added object of an storyboard in the opposite direction of the adjusting direction.

In these implementations, in response to determining that the initial presentation period of the to-be-adjusted target object after adjustment in the adjusting direction overlaps with the initial presentation period of the to-be-added object of the storyboard in the adjusting direction, the executive body may use a similar method as step S13 to determine whether the initial presentation period of the to-be-adjusted target object after adjustment in the opposite direction of the adjusting direction overlaps with the initial presentation period of the to-be-added object of the storyboard in the opposite direction of the adjusting direction, where the adjusting direction is, for example, forward adjustment, then the opposite direction of the adjusting direction may be backward adjustment.

S142, in response to determining that the initial presentation period of the to-be-adjusted target object after adjustment in the opposite direction of the adjusting direction does not overlap with the initial presentation period of the to-be-added object of the storyboard in the opposite direction of the adjusting direction, determining that the preset period adjusting condition is satisfied.

In these implementations, in response to determining that the initial presentation period of the to-be-adjusted target object after adjustment in the opposite direction of the adjusting direction does not overlap with the initial presentation period of the to-be-added object of the storyboard in the opposite direction of the adjusting direction, the executive body may determine that the preset period adjusting condition is satisfied.

Based on the above optional implementations, by trying to adjust in two directions in the time dimension, it is possible to ensure that the to-be-added object does not cross the storyboards as much as possible, thus improving a display effect of the to-be-added object in the target video.

S2, adjusting the initial presentation period of the target object that satisfies the period adjusting condition, so as to prevent the adjusted presentation period of the adjusted target object from crossing storyboards.

In these implementations, the executive body may adjust the initial presentation period of the target object that satisfies the period adjusting condition determined in step S1, so as to prevent the adjusted presentation period of the adjusted target object from crossing the storyboard.

Based on the optional implementations, the executive body can adjust the initial presentation period of the target object that satisfies the period adjusting condition, so as to ensure that the adjusted presentation period of the adjusted target object does not cross the storyboards, thereby improving the display effect of the to-be-added object in the target video.

In an embodiment, the executive body may adjust the initial presentation period of the target object that satisfies the period adjusting condition to a new storyboard, and enable the to-be-added object(s) under the new storyboard to be evenly distributed. As an example, the executive body may firstly adjust the initial presentation period of the target object that satisfies the period adjusting condition to the new storyboard that matches the adjusting direction (for example, the previous storyboard of the crossed storyboard). Afterwards, since the number of to-be-added objects included in the new storyboard increases, the executive body may adjust the presentation period(s) of the to-be-added object(s) included in the new storyboard, so as to enable the to-be-added object(s) to be distributed at an equal interval in the time dimension in the new storyboard, thereby further improving a presentation effect of the to-be-added object in the target video, and further helping to improve a business quality (such as a conversion rate of displayed information).

Step 204, generating object adding indication information based on the determined presentation period.

In this embodiment, based on the presentation period determined in step 203, the executive body may generate the object adding indication information in various modes. The object adding indication information may include time prompt information used to indicate the presentation period of the to-be-added object in the to-be-added object set in the target video. The time prompt information may include a starting moment and an ending moment of the presentation period.

Figure 3:
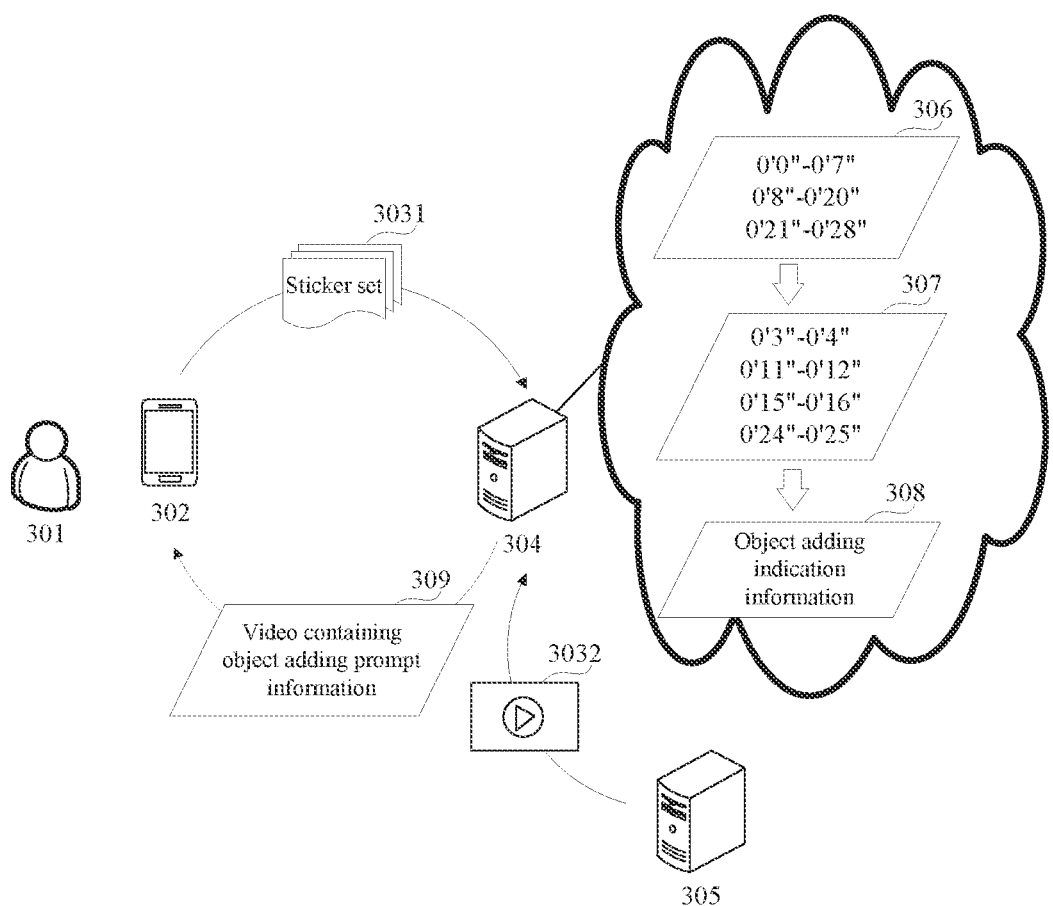
FIG. 3 is a schematic diagram of an application scenario of a method for determining an object adding mode according to an embodiment of the present application.

Continuing to refer to FIG. 3, FIG. 3 is a schematic diagram of an application scenario of a method for determining an object adding mode according to an embodiment of the present application. In the application scenario of FIG. 3, a user 301 sends a sticker set 3031 including 4 stickers to a background server 304 using a terminal 302. The background server 304 obtains a target video 3032 from a database server 305. Afterwards, the background server 304 may determine time periods corresponding to storyboards of the target video 3032 by using a shot boundary detection technology (as shown by 306 in FIG. 3). Next, the background server 304 may determine, based on the determined time periods corresponding to the storyboards, presentation periods of the stickers in the sticker set 3031 in the target video 3032 (as shown by 307 in FIG. 3). Then, the background server 304 may also generate object adding indication information 308, where the object adding indication information 308 may include, for example, a prompt text of "please add a sticker" corresponding to the presentation periods. In an embodiment, the background server 304 may also send to a terminal 302 a video 309 containing the object adding prompt information, which is generated by combining the object adding indication information 308 with the target video 3032, thus enabling the terminal 302 to display the prompt text such as "please add a sticker" when displaying the target video 3032 till a time period indicated by 307 shown in FIG. 3.

At present, one of existing technologies usually determines an object adding time node in the video by means of manual operations, which leads to a low efficiency of adding objects to the video and consumes labor costs. One of the existing technologies also adds business objects at different time nodes of video playback by means of random allocation, since an association with the video is not taken into account when the adding time is determined, a fusion degree and cohesion degree with the video is not high. However, in the method provided by the embodiments of the present application, by firstly determining time periods corresponding to storyboards of a target video, and then determining a presentation period of a to-be-added object in the target video based on the determined time periods, and further generating object adding indication information including time prompt information used to indicate the presentation period of the to-be-added object in the target video, automatic selection of time for adding the to-be-added object to the target video is realized, enabling the presentation period of the to-be-added object in the target video does not cross the storyboards as much as possible, thereby improving a fusion degree and a cohesion degree between the to-be-added object and the target video, and increasing acceptance of a user. Especially in the field of video advertising, a conversion rate of sticker advertisings can be significantly improved.

Figure 4:
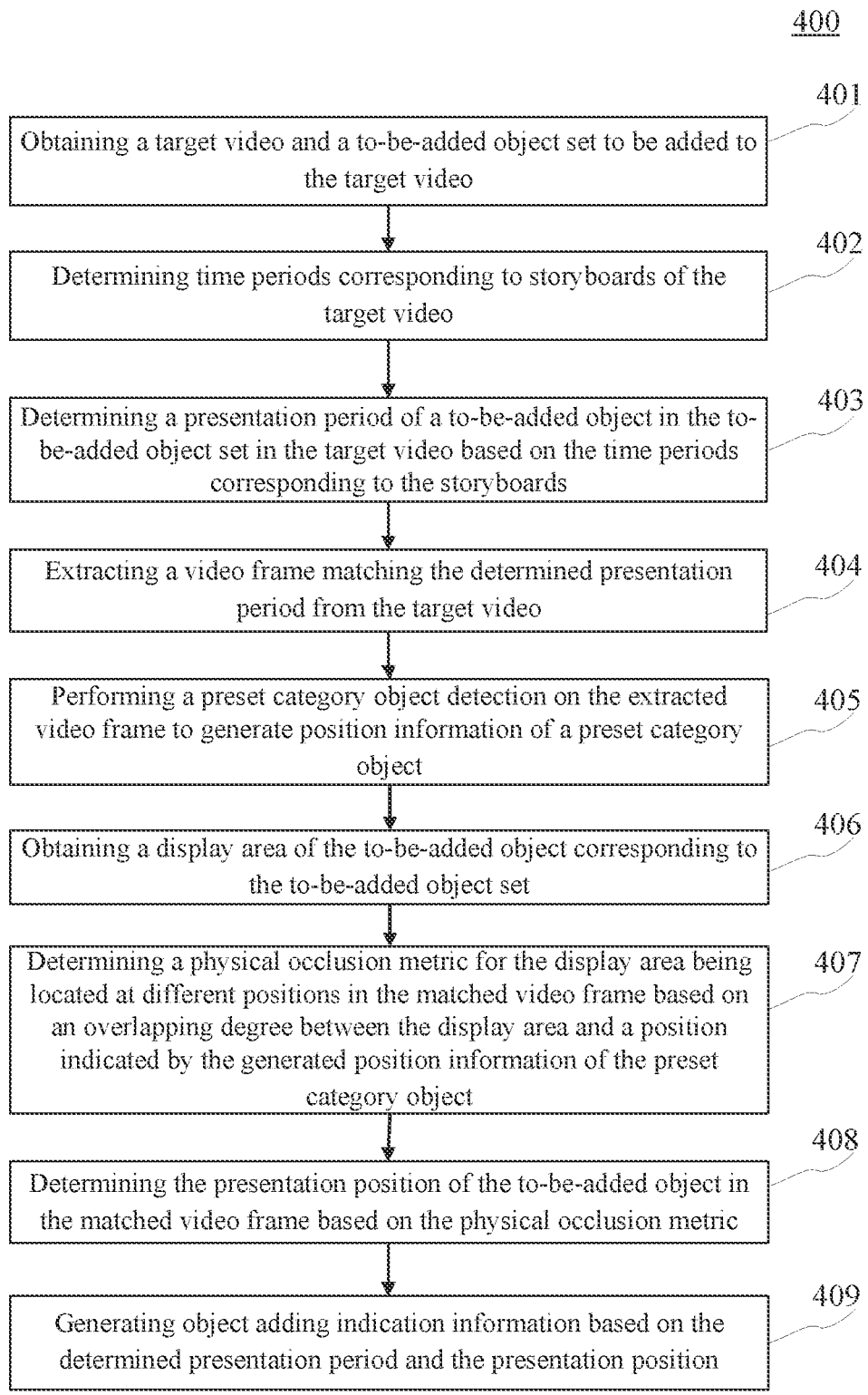
FIG. 4 is a flowchart of yet another embodiment of a method for determining an object adding mode according to the present application.

With further reference to FIG. 4, a flow 400 of yet another embodiment of a method for determining an object adding mode is shown. The flow 400 of the method for determining the object adding mode includes the following steps:

step 401: obtaining a target video and a to-be-added object set to be added to the target video;

step 402: determining time periods corresponding to storyboards of the target video;

step 403, determining a presentation period of a to-be-added object in the to-be-added object set in the target video based on the time periods corresponding to the storyboards.

Steps 401, 402 and 403 are respectively consistent with steps 201, 202 and 203 in the foregoing embodiment, and the above descriptions for steps 201, 202 and 203 are also applicable to steps 401, 402 and 403, and will not be elaborated herein.

Step 404, extracting a video frame matching the determined presentation period from the target video.

In this embodiment, an executive body of the method for determining the object adding mode (for example, the server 105 shown in FIG. 1) can extract the video frame matching the determined presentation period from the target video in various modes. As an example, the executive body may randomly select a video frame from a video frame sequence corresponding to the determined presentation period as the matched video frame. As another example, the executive body may further select a video frame corresponding to starting and ending moments indicated by the presentation period from a video frame sequence corresponding to the determined presentation period as the matched video frame.

Step 405: performing a preset category object detection on the extracted video frame to generate position information of a preset category object.

In this embodiment, the executive body may perform the preset category object detection on the video frame extracted in step 404 through various object detection technologies, to generate the position information of the preset category object. Therefore, the position information corresponding to each preset category object in each extracted video frame can be obtained.

In some optional implementations of this embodiment, the preset category objects may include a human face image and a text image.

Step 406: obtaining a display area of the to-be-added object corresponding to the to-be-added object set.

In this embodiment, the executive body may obtain the display area of the to-be-added object corresponding to the to-be-added object set from a local or communicatively connected electronic device (such as the terminal device in FIG. 1), where the display area may be used to indicate an area occupied by the to-be-added object in the video frame.

In some optional implementations of this embodiment, the executive body may obtain the display area of the to-be-added object corresponding to the to-be-added object set through the following steps:

in a first step, receiving a length-width ratio and a minimum width of the to-be-added object sent by a client.

In these implementations, the executive body may receive the length-width ratio and the minimum width of each to-be-added object sent by the client (such as the terminal device shown in FIG. 1).

In a second step, obtaining the number of characters included in the to-be-added object.

In these implementations, the executive body may obtain the number of characters included in each to-be-added object, such as 10 characters, 8 characters and the like. Here the characters may include but are not limited to Chinese characters, English characters and the like.

In a third step, generating a character area of the to-be-added object based on the number of characters and a size of a preset font.

In these implementations, the executive body may generate the character area of the to-be-added object based on a size of the area occupied by the preset font and the number of characters obtained in the above second step. As an example, the executive body may directly determine a product of the size of the area occupied by the preset font and the number of characters obtained in the second step as the character area of the to-be-added object. As another example, the executive body may determine a required number of lines (such as 2) based on the number of characters (such as 8) obtained in the second step and a preset number of characters (such as 5) displayed in each line. Then, the executive body may determine the product of the preset number of characters displayed in each line, the required number of lines determined and the size of the area occupied by the preset font as the character area of the to-be-added object.

In a fourth step, generating the display area of the to-be-added object based on the character area.

In these implementations, based on the character area generated in the above third step, the executive body may generate the display area of the to-be-added object in various modes. Here a length-width ratio of the display area is generally consistent with the length-width ratio of the to-be-added object sent by the client, and a width of the display area is not less than the minimum width.

Based on the above optional implementations, the display area that satisfies user requirements (for example, scale requirements, minimum width requirements) can be generated based on content included in the to-be-added object.

Step 407, determining a physical occlusion metric for the display area being located at different positions in the matched video frame based on an overlapping degree between the display area and a position indicated by the generated position information of the preset category object.

In this embodiment, the executive body may firstly determine the overlapping degree between the display area obtained in step 406 and the position indicated by the position information of the preset category object generated in step 405, where the overlapping degree may be, for example, the area of an overlapping portion, or may be a ratio between the overlapping portion and the display area. Then, the executive body may determine, based on the determined overlapping degree, the physical occlusion metric for the display area being located at different positions in the matched video frame, where the physical occlusion metric is used to represent an occlusion degree between an entity (entities) in the video frame and the display area.

In some optional implementations of this embodiment, based on the human face image and text image included in the preset category object, and based on the overlapping degree between the display area and the position indicated by the generated position information of the preset category object, the executive body can determine the physical occlusion metric for the display area being located at different positions in the matched video frame through the following steps:

in a first step, determining a first overlapping metric between the display area and a position indicated by generated position information of the human face image.

In these implementations, the executive body may determine the first overlapping metric between the display area and the position indicated by the generated position information of the human face image. The first overlapping metric is used to represent an occlusion degree between the display area and the human face image in the video frame. As an example, the executive body may firstly determine overlapping degrees between areas occupied by human face images indicated by position information of the human face images included in the matched image frame and the display area. Then, the executive body may determine a sum of the overlapping degrees as the first overlapping metric. As yet another example, the executive body may determine the number of human face images of which areas occupied by the human face images indicated by position information of human face images included in the matched image frame overlap with the display area as the first overlapping metric.

In the second step, determining a second overlapping metric between the display area and a position indicated by the generated position information of the text image.

In these implementations, the executive body may determine the second overlapping metric in a manner similar to the above first step.

In a third step, determining the physical occlusion metric for the display area being located at different positions in the matched video frame based on the generated first overlapping metric and second overlap metric.

In these implementations, the executive body may integrate the generated first overlapping metric and second overlapping metric in various modes (for example, taking a maximum value, a minimum value, a weighted average and the like) to determine the physical occlusion metric for the display area being located at different positions in the matched video frame.

Based on the above optional implementations, the executive body may generate the physical occlusion metric based on the overlapping degree between the to-be-added object and the human face image and text image, thus refining evaluation of a physical occlusion degree when the to-be-added objects are located at different positions, providing a data basis for determination of the final presentation position.

Step 408: determining the presentation position of the to-be-added object in the matched video frame based on the physical occlusion metric.

In this embodiment, based on the physical occlusion metric determined in step 407, the executive body may determine the presentation position of the to-be-added object in the matched video frame in various modes. As an example, the executive body may select a position representing the smallest physical occlusion degree as the presentation position of the to-be-added object in the matched video frame based on the determined physical occlusion metric. As another example, the executive body may firstly select presentation positions representing that the physical occlusion degree satisfies a preset requirement as quasi-presentation positions based on the determined physical occlusion metric. Afterwards, the executive body may determine the presentation position of the to-be-added object in the matched video frame from the quasi-presentation positions in various modes. For example, randomly selecting the presentation position from the quasi-presentation positions. For another example, determining a position closest to a center position of the video frame among the quasi-presentation positions as the presentation position.

In some optional implementations of this embodiment, the executive body may determine the presentation position of the to-be-added object in the matched video frame based on the physical occlusion metric through the following steps:

in a first step, obtaining a position preference metric of the to-be-added object.

In these implementations, the executive body may obtain the position preference metric of the to-be-added object in various modes. The position preference metric may include at least one of the following: a user position preference metric, a position saliency metric of the to-be-added object and a regularity metric of the presentation position of the to-be-added object. The user position preference metric may be used to indicate matching degrees between different positions of the to-be-added object in the matched video frame and a preset user preference position. The position saliency metric can be used to indicate the saliency at different positions of the to-be-added object in the matched video frame, for example, the saliency at the upper left, lower left, upper right and lower right positions of the video frame is weak. The regularity metric of the presentation position may be used to indicate the regularity of presentation positions of multiple to-be-added objects that are adjacent in a presentation order in their respective matched video frames. Here the regularity may be, for example, symmetry, or may be a clockwise or counterclockwise order.

In a second step, based on the physical occlusion metric and the position preference metric, generating position evaluation metrics for the display area being located at different positions in the matched video frame.

In these implementations, based on the physical occlusion metric determined in step 407 and the position preference metric obtained in the above first step, the executive body can generate the position evaluation metrics for the display area being located at different positions in the matched video frame in various modes. Here a value of the position evaluation metric may generally be negatively correlated with the occlusion degree indicated by the physical occlusion metric. The value of the position evaluation metric may generally be positively correlated with at least one of the matching degree, saliency and regularity indicated by the position preference metric.

In the third step, determining a position corresponding to the maximum value of the position evaluation metrics as the presentation position of the to-be-added object in the matched video frame.

In these implementations, the executive body may determine the position whose position evaluation metric generated in the above second step has a highest score as the presentation position of the to-be-added object in the matched video frame. In an embodiment, if the value of the position evaluation metric is positively correlated with the occlusion degree indicated by the physical occlusion metric or negatively correlated with at least one of the matching degree, saliency and regularity indicated by the position preference metric, then the executive body may determine the position corresponding to the minimum value of the position evaluation metrics as the presentation position of the to-be-added object in the matched video frame, which will not be elaborated herein.

Step 409, generating object adding indication information based on the determined presentation period and the presentation position.

In this embodiment, based on the presentation period determined in step 403 and the presentation position determined in step 408, the executive body may generate the object adding indication information in various modes, where the object adding indication information may further include position indication information used to indicate the presentation position of the to-be-added object in the to-be-added object set in the video frame of the target video.

In some optional implementations of this embodiment, the position indication information may include a center coordinate used to indicate a display position of the to-be-added object. The position indication information may also include a prompt box displayed at the determined presentation position.

As can be seen from FIG. 4, the flow 400 of the method for determining the object adding mode in this embodiment represents the step of determining the physical occlusion metric for the display area of the to-be-added object being located at different positions in the video frame, and the step of determining the presentation position in the video frame based on the determined physical occlusion metric. Therefore, the object adding indication information generated by a solution described in this embodiment can be used to indicate both the presentation period and the presentation position, thereby realizing automatic determination of the presentation position and the presentation period of the to-be-added object in the target video, effectively reducing costs caused by manual adding and improving an efficiency.

Figure 5:
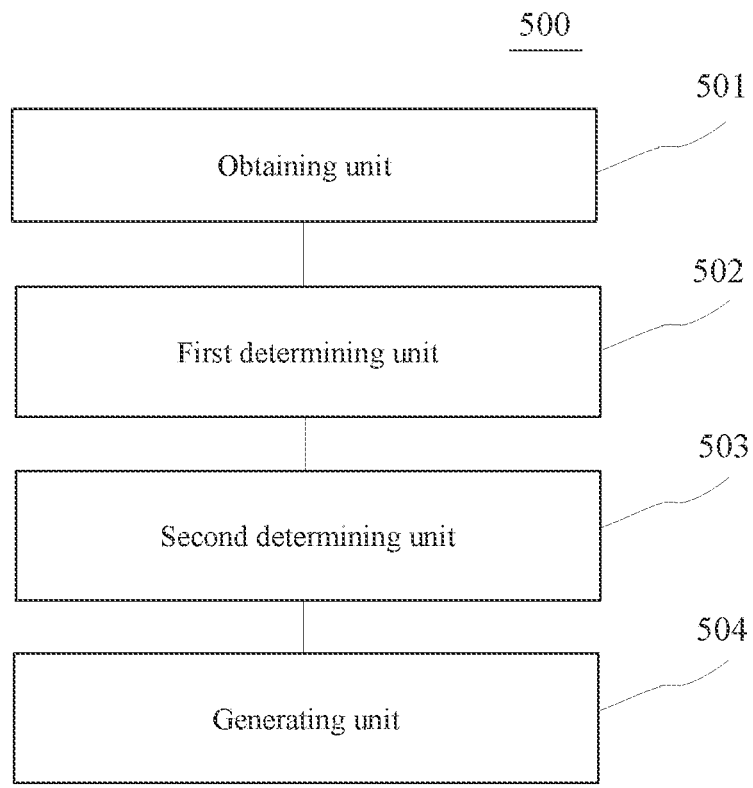
FIG. 5 is a schematic structural diagram of an embodiment of an apparatus for determining an object adding mode according to the present application.

With further reference to FIG. 5, as an implementation of the methods shown in the above drawings, the present application provides an embodiment of an apparatus for determining an object adding mode, and the apparatus embodiment corresponds to the method embodiment shown in FIG. 2 or FIG. 4, and the apparatus can be specifically applied to various electronic devices.

As shown in FIG. 5, the apparatus 500 for determining the object adding mode provided in this embodiment includes an obtaining unit 501, a first determining unit 502, a second determining unit 503 and a generating unit 504. Among them, the obtaining unit 501 is configured to obtain a target video and a to-be-added object set to be added to a target video; the first determining unit 502 is configured to determine time periods corresponding to storyboards of the target video; the second determining unit 503 is configured to determine a presentation period of a to-be-added object in the target video based on the time periods corresponding to the storyboards; the generating unit 504 is configured to generate object adding indication information based on the determined presentation period, where the object adding indication information includes time prompt information used to indicate the presentation period of the to-be-added object in the to-be-added object set in the target video.

In this embodiment, in the apparatus 500 for determining the object adding mode, reference can be made to related descriptions of step 201, step 202, step 203 and step 204 in the embodiment corresponding to FIG. 2 respectively for specific processing of the obtaining unit 501, the first determining unit 502, the second determining unit 503 and the generating unit 504 and technical effects brought by these units, which will not be elaborated herein.

In some optional implementations of this embodiment, the second determining unit 503 may include a first determining subunit (not shown in the drawings), a second determining subunit (not shown in the drawings), and a selecting subunit (not shown in the drawings), an adjusting subunit (not shown in the drawings). Among them, the first determining subunit may be configured to determine a total duration of the target video. The second determining subunit may be configured to determine an initial presentation period of the to-be-added object in the to-be-added object set in the target video based on the total duration of the target video. The selecting subunit may be configured to select a to-be-added object crossing storyboards from the to-be-added object set to generate a target object set, based on a matching between the determined initial presentation period and the time periods corresponding to the storyboards of the target video. The adjusting subunit may be configured to determine the presentation period of the to-be-added object in the to-be-added object set in the target video based on an adjustment on the initial presentation period of a target object in the target object set.

In some optional implementations of this embodiment, the adjusting subunit may include a first determining module (not shown in the drawings) and an adjusting module (not shown in the drawings). Among them, the first determining module may be configured to determine whether the target object in the target object set satisfies a preset period adjusting condition. The adjusting module may be configured to adjust the initial presentation period of the target object that satisfies the period adjusting condition, and prevent the adjusted presentation period of the adjusted target object from crossing storyboards.

In some optional implementations of this embodiment, the first determining module may include a first determining submodule (not shown in the drawings), a second determining submodule (not shown in the drawings), and a third determining submodule (not shown in the drawings), a fourth determining submodule (not shown in the drawings). Among them, the first determining submodule may be configured to determine a shot switching moment corresponding to the target object in the target object set based on the determined initial presentation period and the time periods corresponding to the storyboards of the target video. The second determining submodule may be configured to determine an adjusting direction of an initial presentation period of a to-be-adjusted target object in a time dimension based on the determined shot switching moment. The third determining submodule may be configured to determine whether the initial presentation period of the to-be-adjusted target object after adjustment in the adjusting direction overlaps with an initial presentation period of a to-be-added object of a storyboard in the adjusting direction. The fourth determining submodule may be configured to determine whether the target object in the target object set satisfies the preset period adjusting condition, based on whether the initial presentation period of the to-be-adjusted target object after adjustment in the adjusting direction overlaps with the initial presentation period of the to-be-added object of the storyboard in the adjusting direction.

In some optional implementations of this embodiment, the third determining submodule may be further configured to: determine a presentation interval between a to-be-added object closest to the initial presentation period of the to-be-adjusted target object and the to-be-adjusted target object in the adjusting direction; determine whether the initial presentation period of the to-be-adjusted target object after adjustment in the adjusting direction overlaps with the initial presentation period of the to-be-added object of the storyboard in the adjusting direction, based on a comparison between the presentation interval and a duration indicated by the initial presentation period of the to-be-adjusted target object.

In some optional implementations of this embodiment, the third determining submodule may be further configured to: determine a total duration of the initial presentation period of the to-be-added object corresponding to a target storyboard, where the target storyboard is consistent with the adjusting direction, and overlaps with the initial presentation period of the to-be-adjusted target object; determine whether the initial presentation period of the to-be-adjusted target object after adjustment in the adjusting direction overlaps with the initial presentation period of the to-be-added object of the storyboard in the adjusting direction, based on the total duration and the duration of the time period corresponding to the target storyboard.

In some optional implementations of this embodiment, the fourth determining submodule may be further configured to: in response to determining that the initial presentation period of the to-be-adjusted target object after adjustment in the adjusting direction does not overlap with the initial presentation period of the to-be-added object of the storyboard in the adjusting direction, determine that the preset period adjusting condition is satisfied.

In some optional implementations of this embodiment, the fourth determining submodule may be further configured to: in response to determining that the initial presentation period of the to-be-adjusted target object after adjustment in the adjusting direction overlaps with the initial presentation period of the to-be-added object of the storyboard in the adjusting direction, determine whether an initial presentation period of the to-be-adjusted target object after adjustment in an opposite direction of the adjusting direction overlaps with an initial presentation period of a to-be-added object of a storyboard in the opposite direction of the adjusting direction; in response to determining that the initial presentation period of the to-be-adjusted target object after adjustment in the opposite direction of the adjusting direction does not overlap with the initial presentation period of the to-be-added object of the storyboard in the opposite direction of the adjusting direction, determine that the preset period adjusting condition is satisfied.

In some optional implementations of this embodiment, the adjusting module may be further configured to, adjust the initial presentation period of the target object that satisfies the period adjusting condition to a new storyboard, and enable the to-be-added object under the new storyboard to be evenly distributed.

In some optional implementations of this embodiment, the object adding indication information may further include position indication information used to indicate a presentation position of the to-be-added object in the to-be-added object set in a video frame of the target video. The above generating unit 504 may include: an extracting subunit (not shown in the drawings), a first generating subunit (not shown in the drawings), an obtaining subunit (not shown in the drawings), a third determining subunit (not shown in the drawings), a fourth determining subunit (not shown in the drawings), and a second generating subunit (not shown in the drawings). The extracting subunit may be configured to extract a video frame matching the determined presentation period from the target video. The first generating subunit may be configured to perform a preset category object detection on the extracted video frame to generate position information of a preset category object. The obtaining subunit may be configured to obtain a display area of the to-be-added object corresponding to the to-be-added object set. The third determining subunit may be configured to determine a physical occlusion metric for the display area being located at different positions in the matched video frame based on an overlapping degree between the display area and a position indicated by the generated position information of the preset category object. The fourth determining subunit may be configured to determine a presentation position of the to-be-added object in the matched video frame based on the physical occlusion metric. The second generating subunit may be configured to generate the object adding indication information based on the determined presentation period and the presentation position.

In some optional implementations of this embodiment, the preset category objects may include a human face image and a text image. The third determining subunit may include a fifth determining submodule (not shown in the drawings), a sixth determining submodule (not shown in the drawings), and a seventh determining submodule (not shown in the drawings). Among them, the fifth determining submodule may be configured to determine a first overlapping metric between the display area and a position indicated by generated position information of the human face image. The sixth determining submodule may be configured to determine a second overlapping metric between the display area and a position indicated by generated position information of the text image. The seventh determining submodule may be configured to determine the physical occlusion metric for the display area being located at different positions in the matched video frame based on the generated first overlapping metric and second overlapping metric.

In some optional implementations of this embodiment, the obtaining subunit may include a receiving module (not shown in the drawings), a first obtaining module (not shown in the drawings), a first generating module (not shown in the drawings) out), and a second generating module (not shown in the drawings). The receiving module may be configured to receive a length-width ratio and a minimum width of the to-be-added object sent by a client. The first obtaining module may be configured to obtain a number of characters included in the to-be-added object. The first generating module may be configured to generate a character area of the to-be-added object based on the number of characters and a size of a preset font. The second generating module may be configured to generate the display area of the to-be-added object based on the character area, where a length-width ratio of the display area may be consistent with the length-width ratio of the to-be-added object sent by the client, a width of the display area may be no less than the minimum width.

In some optional implementations of this embodiment, the fourth determining subunit may include a second obtaining module (not shown in the drawings), a third generating module (not shown in the drawings), and a second determining module (not shown in the drawings). Among them, the second obtaining module may be configured to obtain a position preference metric of the to-be-added object, where the position preference metric may include at least one of the following: a user position preference metric, a position saliency metric of the to-be-added object, and a regularity metric of the presentation position of the to-be-added object. The third generating module may be configured to generate position evaluation metrics for the display area being located at different positions in the matched video frame based on the physical occlusion metric and the position preference metric. The second determining module may be configured to determine a position corresponding to a maximum value of the position evaluation metrics as the presentation position of the to-be-added object in the matched video frame.

In the apparatus provided by the above embodiments of the present application, the first determining unit 502 firstly determines time periods corresponding to storyboards of a target video, and then the second determining unit 503 determines a presentation period of a to-be-added object in the target video based on the determined time periods, further the generating unit 504 generates object adding indication information including time prompt information used to indicate the presentation period of the to-be-added object in the target video. In this way, automatic selection of time for adding the to-be-added object to the target video is realized, enabling the presentation period of the to-be-added object in the target video does not cross the storyboards as much as possible, thereby improving a fusion degree and a cohesion degree between the to-be-added object and the target video, and increasing acceptance of a user. Especially in the field of video advertising, a conversion rate of sticker advertisings can be significantly improved.

Figure 6:
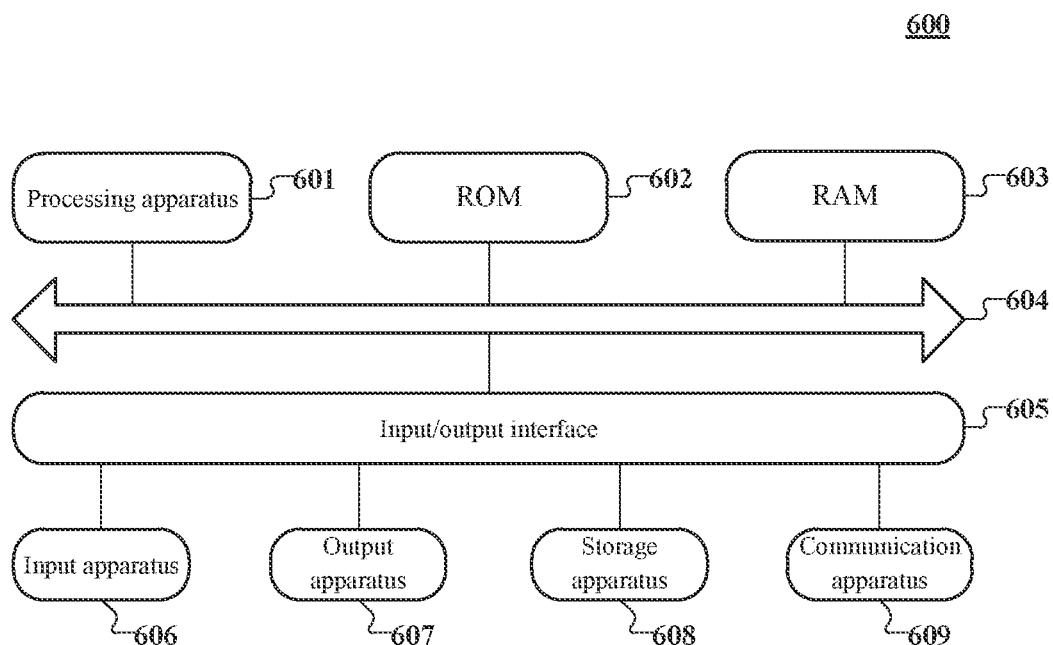
FIG. 6 is a schematic structural diagram of an electronic device suitable for implementing embodiments of the present application.

Referring to FIG. 6, it shows a schematic structural diagram of an electronic device (such as the server or terminal device in FIG. 1) 600 suitable for implementing embodiments of the present application. Terminal devices in the embodiments of the present application may include, but are not limited to, mobile phones, notebook computers, digital broadcast receivers, personal digital assistants (PDA), tablet computers (PAD), portable multimedia players (PMP), in-vehicle terminals (such as in-vehicle navigation terminals) and the like, and stationary terminals such as digital TVs, desktop computers and the like. The terminal device or server shown in FIG. 6 is only an example, and should not impose any limitations on functions and the scope of use of the embodiments of the present application.

As shown in FIG. 6, the electronic device 600 may include a processing apparatus (for example, a central processing unit, a graphics processor and the like) 601, which may execute various appropriate actions and processes based on a program stored in a read-only memory (ROM) 602 or a program loaded into a random access memory (RAM) 603 from a storage device 608. In the RAM 603, various programs and data necessary for operations of the electronic device 600 are also stored. The processing apparatus 601, the ROM 602, and the RAM 603 are connected to each other through a bus 604. An input/output (I/O) interface 605 is also connected to the bus 604.

Typically, the following apparatus can be connected to the I/O interface 605: an input apparatus 606 including, for example, a touch screen, a touchpad, a keyboard, a mouse, a camera, a microphone, an accelerometer, a gyroscope and the like; an output apparatus 607 including, for example, a liquid crystal display (LCD), a speaker, a vibrator and the like; a storage apparatus 608, including, for example, a magnetic tape, a hard disk and the like; and a communication apparatus 609. The communication apparatus 609 may allow the electronic device 600 to communicate wirelessly or through wires with other devices to exchange data. While FIG. 6 shows the electronic device 600 having various apparatus, it should be understood that not all of the illustrated apparatus are required to be implemented or provided. More or fewer apparatus may alternatively be implemented or provided. Each block shown in FIG. 6 may represent one apparatus, or may represent multiple apparatus as required.

In particular, according to the embodiments of the present application, the processes described above with reference to the flowcharts may be implemented as computer software programs. For example, an embodiment of the present application includes a computer program product, which includes a computer program carried on a computer-readable medium, the computer program contains program codes for performing the method illustrated in the flowchart. In such an embodiment, the computer program may be downloaded and installed from a network via the communication apparatus 609, or installed from the storage apparatus 608, or installed from the ROM 602. When the computer program is executed by the processing apparatus 601, the steps in the method in the embodiments of the present application are executed, so as to realize the defined functions.

Embodiments of the present disclosure also provide a computer program, where the computer program is stored in a readable storage medium, and one or more processors of an electronic device can read the computer program from the readable storage medium, and one or more processors execute the computer program, so that the electronic device executes the solution provided by any of the above embodiments.

It should be noted that, the computer-readable medium described in the embodiments of the present application may be a computer-readable signal medium or a computer-readable storage medium, or any combination of the above two. The computer-readable storage medium can be, for example, but not limited to, an electrical, magnetic, optical, electromagnetic, infrared or semiconductor system, apparatus or device, or a combination of any of the above. More specific examples of the computer-readable storage medium may include, but are not limited to, electrical connections with one or more wires, portable computer disks, hard disks, random access memories (RAM), read only memories (ROM), erasable programmable read-only memories (electrically programmable read-only memory (EPROM) or flash memory), optical fibers, portable compact disc read-only memories (CD-ROM), optical storage devices, magnetic memory devices, or any suitable combination of the above. In the embodiments of the present application, the computer-readable storage medium may be any tangible mediums that contain or store a program that can be used by or in conjunction with an instruction execution system, apparatus or device. While in embodiments of the present application, the computer-readable signal medium may include a data signal in baseband or propagated as part of a carrier wave, which carries computer-readable program codes. Such propagated data signal may take a variety of forms, including but not limited to an electromagnetic signal, an optical signal or any suitable combination of the above. The computer-readable signal medium can also be any computer-readable medium other than the computer-readable storage medium, and the computer-readable signal medium can transmit, propagate or transport the program for use by or in conjunction with the instruction execution system, apparatus or device. The program code contained on the computer-readable medium may be transmitted by any suitable medium, including but not limited to: an electric wire, an optical fiber cable, a radio frequency (RF) and the like, or any suitable combination of the above.

The computer-readable medium may be included in the electronic device; or may exist alone without being assembled into the electronic device. The computer-readable medium carries one or more programs, and when the one or more programs are executed by the electronic device, the electronic device is enabled to: obtain a target video and a to-be-added object set to be added to the target video; determine time periods corresponding to storyboards of the target video: determine a presentation period of a to-be-added object in the to-be-added object set in the target video based on the time periods corresponding to the storyboards: generate object adding indication information based on the determined presentation period, where the object adding indication information includes time prompt information used to indicate the presentation period of the to-be-added object in the target video.

Computer program codes for performing the operations of the embodiments of the present application may be written in one or more programming languages, the programming languages include object-oriented programming languages-such as Java. Smalltalk, C++, and also includes conventional procedural programming languages-such as the "C" language, Python or similar programming languages. The program code may be executed entirely on a user's computer, partly on the user's computer, as a stand-alone software package, partly on the user's computer and partly on a remote computer, or entirely on the remote computer or a server. In a case where the remote computer is involved, the remote computer may be connected to the user's computer through any kind of networks, including a local area network (LAN) or a wide area network (WAN), or may be connected to an external computer (for example, connected via the Internet through an Internet service provider).

Flowcharts and block diagrams in the accompanying drawings illustrate an architecture, a functionality, and an operation of possible implementations of systems, methods and computer program products according to various embodiments of the present application. In this regard, each block in the flowchart or block diagrams may represent a module, a storyboard, or a code segment that contains one or more executable instructions used to implement specified logical functions. It should also be noted that, in some alternative implementations, the functions noted in the blocks may occur in an order different from those noted in the accompanying drawings. For example, two blocks shown in succession may, in fact, be executed substantially concurrently, or sometimes be executed in a reverse order, depending upon the functionality involved. It should also be noted that, each block of the block diagrams and/or flowcharts, and combinations of blocks in the block diagrams and/or flowcharts can be implemented in dedicated hardware-based systems that perform the specified functions or operations, or can be implemented in a combination of dedicated hardware and computer instructions.

Units involved in the embodiments of the present application may be implemented in a software manner, and may also be implemented in a hardware manner. The described unit may also be provided in a processor, for example, it may be described as: a processor, including an obtaining unit, a first determining unit, a second determining unit and a generating unit. Among them, names of these units do not constitute a limitation of the units per se under certain circumstances. For example, the obtaining unit may also be described as "a unit for obtaining a target video and a to-be-added object set to be added to the target video".

The above description is only a preferred embodiment of the present application and an illustration of applied technical principles. Those skilled in the art should understand that, a disclosure scope involved in the embodiments of the present application is not limited to the technical solutions formed by specific combinations of the technical features, and should also cover other technical solutions formed by any combination of the above technical features or their equivalent features without departing from a concept of the present disclosure, for example, technical solutions formed by replacing the above features with the technical features with similar functions as those disclosed in the embodiments of the present application (but not limited thereto).

What is claimed is:

1. A method for determining an object adding mode, comprising:
   obtaining a target video and a to-be-added object set to be added to the target video;
   determining time periods corresponding to storyboards of the target video;
   determining a presentation period of a to-be-added object in the to-be-added object set in the target video based on the time periods corresponding to the storyboards; and
   generating object adding indication information based on the determined presentation period, wherein the object adding indication information comprises time prompt information used to indicate the presentation period of the to-be-added object in the to-be-added object set in the target video;
   wherein determining the presentation period of the to-be-added object in the to-be-added object set in the target video based on the time periods corresponding to the storyboards comprises:
   determining a total duration of the target video;
   determining an initial presentation period of the to-be-added object in the to-be-added object set in the target video based on the total duration of the target video;
   selecting a to-be-added object crossing storyboards from the to-be-added object set to generate a target object set, based on a matching between the determined initial presentation period and the time periods corresponding to the storyboards of the target video; and
   determining the presentation period of the to-be-added object in the to-be-added object set in the target video based on an adjustment on the initial presentation period of a target object in the target object set.

2. The method according to claim 1, wherein determining the presentation period of the to-be-added object in the to-be-added object set in the target video based on the adjustment on the initial presentation period of the target object in the target object set comprises:
   determining whether the target object in the target object set satisfies a preset period adjusting condition;
   adjusting the initial presentation period of the target object that satisfies the period adjusting condition, so as to prevent the adjusted presentation period of the adjusted target object from crossing storyboards.

3. The method according to claim 2, wherein determining whether the target object in the target object set satisfies the preset period adjusting condition comprises:
   determining a shot switching moment corresponding to the target object in the target object set based on the determined initial presentation period and the time periods corresponding to the storyboards of the target video;
   determining an adjusting direction of an initial presentation period of a to-be-adjusted target object in a time dimension based on the determined shot switching moment;
   determining whether the initial presentation period of the to-be-adjusted target object after adjustment in the adjusting direction overlaps with an initial presentation period of a to-be-added object of a storyboard in the adjusting direction;
   determining whether the target object in the target object set satisfies the preset period adjusting condition, based on whether the initial presentation period of the to-be-adjusted target object after adjustment in the adjusting direction overlaps with the initial presentation period of the to-be-added object of the storyboard in the adjusting direction.

4. The method according to claim 3, wherein determining whether the initial presentation period of the to-be-adjusted target object after adjustment in the adjusting direction overlaps with the initial presentation period of the to-be-added object of the storyboard in the adjusting direction comprises:
   determining a presentation interval between a to-be-added object closest to the initial presentation period of the to-be-adjusted target object and the to-be-adjusted target object in the adjusting direction;
   determining whether the initial presentation period of the to-be-adjusted target object after adjustment in the adjusting direction overlaps with the initial presentation period of the to-be-added object of the storyboard in the adjusting direction, based on a comparison between the presentation interval and a duration indicated by the initial presentation period of the to-be-adjusted target object.

5. The method according to claim 3, wherein determining whether the initial presentation period of the to-be-adjusted target object after adjustment in the adjusting direction overlaps with the initial presentation period of the to-be-added object of the storyboard in the adjusting direction comprises:
   determining a total duration of the initial presentation period of the to-be-added object corresponding to a target storyboard, wherein the target storyboard is consistent with the adjusting direction, and overlaps with the initial presentation period of the to-be-adjusted target object;
   determining whether the initial presentation period of the to-be-adjusted target object after adjustment in the adjusting direction overlaps with the initial presentation period of the to-be-added object of the storyboard in the adjusting direction, based on the total duration and the duration of the time period corresponding to the target storyboard.

6. The method according to claim 3, wherein determining whether the target object in the target object set satisfies the preset period adjusting condition, based on whether the initial presentation period of the to-be-adjusted target object after adjustment in the adjusting direction overlaps with the initial presentation period of the to-be-added object of the storyboard in the adjusting direction comprises:
   in response to determining that the initial presentation period of the to-be-adjusted target object after adjustment in the adjusting direction does not overlap with the initial presentation period of the to-be-added object of the storyboard in the adjusting direction, determining that the preset period adjusting condition is satisfied.

7. The method according to claim 3, wherein determining whether the target object in the target object set satisfies the preset period adjusting condition, based on whether the initial presentation period of the to-be-adjusted target object after adjustment in the adjusting direction overlaps with the initial presentation period of the to-be-added object of the storyboard in the adjusting direction comprises:
in response to determining that the initial presentation period of the to-be-adjusted target object after adjustment in the adjusting direction overlaps with the initial presentation period of the to-be-added object of the storyboard in the adjusting direction, determining whether an initial presentation period of the to-be-adjusted target object after adjustment in an opposite direction of the adjusting direction overlaps with an initial presentation period of a to-be-added object of a storyboard in the opposite direction of the adjusting direction;
in response to determining that the initial presentation period of the to-be-adjusted target object after adjustment in the opposite direction of the adjusting direction does not overlap with the initial presentation period of the to-be-added object of the storyboard in the opposite direction of the adjusting direction, determining that the preset period adjusting condition is satisfied.

8. The method according to claim 2, wherein adjusting the initial presentation period of the target object that satisfies the period adjusting condition comprises:
adjusting the initial presentation period of the target object that satisfies the period adjusting condition to a new storyboard, and enabling the to-be-added object under the new storyboard to be evenly distributed.

9. The method according to claim 1, wherein the object adding indication information further comprises position indication information used to indicate a presentation position of the to-be-added object in the to-be-added object set in a video frame of the target video; and
wherein generating the object adding indication information based on the determined presentation period comprises:
extracting a video frame matching the determined presentation period from the target video;
performing a preset category object detection on the extracted video frame to generate position information of a preset category object;
obtaining a display area of the to-be-added object corresponding to the to-be-added object set;
determining a physical occlusion metric for the display area being located at different positions in the matched video frame based on an overlapping degree between the display area and a position indicated by the generated position information of the preset category object;
determining a presentation position of the to-be-added object in the matched video frame based on the physical occlusion metric;
generating the object adding indication information based on the determined presentation period and the presentation position.

10. The method according to claim 9, wherein the preset category object comprises a human face image and a text image; and
wherein determining the physical occlusion metric for the display area being located at different positions in the matched video frame based on the overlapping degree between the display area and the position indicated by the generated position information of the preset category object comprises:
determining a first overlapping metric between the display area and a position indicated by generated position information of the human face image;
determining a second overlapping metric between the display area and a position indicated by generated position information of the text image;
determining the physical occlusion metric for the display area being located at different positions in the matched video frame based on the generated first overlapping metric and second overlapping metric.

11. The method according to claim 9, wherein obtaining the display area of the to-be-added object corresponding to the to-be-added object set comprises:
receiving a length-width ratio and a minimum width of the to-be-added object sent by a client;
obtaining a number of characters comprised in the to-be-added object;
generating a character area of the to-be-added object based on the number of characters and a size of a preset font;
generating the display area of the to-be-added object based on the character area, wherein a length-width ratio of the display area is consistent with the length-width ratio of the to-be-added object sent by the client, and a width of the display area is not less than the minimum width.

12. The method according to claim 9, wherein determining the presentation position of the to-be-added object in the matched video frame based on the physical occlusion metric comprises:
obtaining a position preference metric of the to-be-added object, wherein the position preference metric comprises at least one of the following: a user position preference metric, a position saliency metric of the to-be-added object, and a regularity metric of the presentation position of the to-be-added object;
generating position evaluation metrics for the display area being located at different positions in the matched video frame based on the physical occlusion metric and the position preference metric;
determining a position corresponding to a maximum value of the position evaluation metrics as the presentation position of the to-be-added object in the matched video frame.

13. An apparatus for determining an object adding mode, comprising:
at least one processor; and
a memory communicatively connected with the at least one processor;
the at least one processor executes computer-executable instructions stored in the memory to cause the at least one processor to:
obtain a target video and a to-be-added object set to be added to the target video;
determine time periods corresponding to storyboards of the target video;
determine a presentation period of a to-be-added object in the target video based on the time periods corresponding to the storyboards; and
generate object adding indication information based on the determined presentation period, wherein the object adding indication information comprises time prompt information used to indicate the presentation period of the to-be-added object in the to-be-added object set in the target video;
wherein the at least one processor is further configured to:
determine a total duration of the target video;

determine an initial presentation period of the to-be-added object in the to-be-added object set in the target video based on the total duration of the target video;

select a to-be-added object crossing storyboards from the to-be-added object set to generate a target object set, based on a matching between the determined initial presentation period and the time periods corresponding to the storyboards of the target video; and determine the presentation period of the to-be-added object in the to-be-added object set in the target video based on an adjustment on the initial presentation period of a target object in the target object set.

14. The apparatus according to claim 13, wherein the at least one processor is further configured to:

determine whether the target object in the target object set satisfies a preset period adjusting condition;

adjust the initial presentation period of the target object that satisfies the period adjusting condition, so as to prevent the adjusted presentation period of the adjusted target object from crossing storyboards.

15. The apparatus according to claim 14, wherein the at least one processor is further configured to:

determine a shot switching moment corresponding to the target object in the target object set based on the determined initial presentation period and the time periods corresponding to the storyboards of the target video;

determine an adjusting direction of an initial presentation period of a to-be-adjusted target object in a time dimension based on the determined shot switching moment;

determine whether the initial presentation period of the to-be-adjusted target object after adjustment in the adjusting direction overlaps with an initial presentation period of a to-be-added object of a storyboard in the adjusting direction;

determine whether the target object in the target object set satisfies the preset period adjusting condition, based on whether the initial presentation period of the to-be-adjusted target object after adjustment in the adjusting direction overlaps with the initial presentation period of the to-be-added object of the storyboard in the adjusting direction.

16. The apparatus according to claim 15, wherein the at least one processor is further configured to:

determine a presentation interval between a to-be-added object closest to the initial presentation period of the to-be-adjusted target object and the to-be-adjusted target object in the adjusting direction;

determine whether the initial presentation period of the to-be-adjusted target object after adjustment in the adjusting direction overlaps with the initial presentation period of the to-be-added object of the storyboard in the adjusting direction, based on a comparison between the presentation interval and a duration indicated by the initial presentation period of the to-be-adjusted target object.

17. The apparatus according to claim 15, wherein the at least one processor is further configured to:

determine a total duration of the initial presentation period of the to-be-added object corresponding to a target storyboard, wherein the target storyboard is consistent with the adjusting direction, and overlaps with the initial presentation period of the to-be-adjusted target object;

determine whether the initial presentation period of the to-be-adjusted target object after adjustment in the adjusting direction overlaps with the initial presentation period of the to-be-added object of the storyboard in the adjusting direction, based on the total duration and the duration of the time period corresponding to the target storyboard.

18. A non-transitory computer-readable storage medium on which a computer program is stored, wherein when the program is executed by a processor, the processor is enabled to:

obtain a target video and a to-be-added object set to be added to the target video;

determine time periods corresponding to storyboards of the target video;

determine a presentation period of a to-be-added object in the to-be-added object set in the target video based on the time periods corresponding to the storyboards; and generate object adding indication information based on the determined presentation period, wherein the object adding indication information comprises time prompt information used to indicate the presentation period of the to-be-added object in the to-be-added object set in the target video;

wherein the processor is further enabled to:

determine a total duration of the target video;

determine an initial presentation period of the to-be-added object in the to-be-added object set in the target video based on the total duration of the target video;

select a to-be-added object crossing storyboards from the to-be-added object set to generate a target object set, based on a matching between the determined initial presentation period and the time periods corresponding to the storyboards of the target video; and determine the presentation period of the to-be-added object in the to-be-added object set in the target video based on an adjustment on the initial presentation period of a target object in the target object set.

* * * * *